(No Model.)
H. F. NORTON.
FISH OR SEAL SPEAR.
No. 546,428. Patented Sept. 17, 1895.
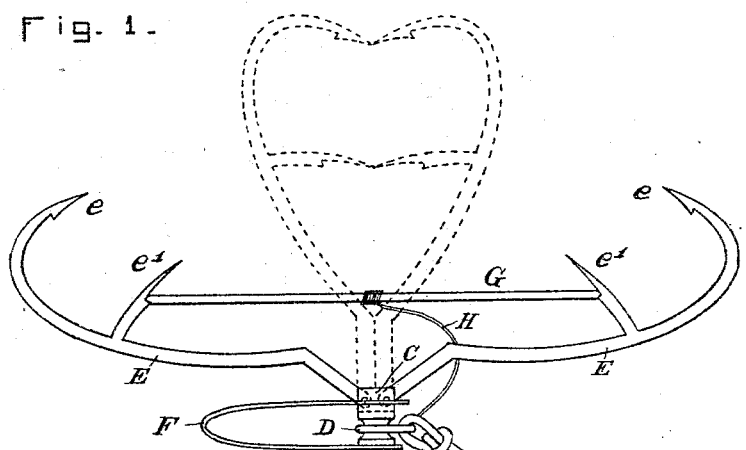
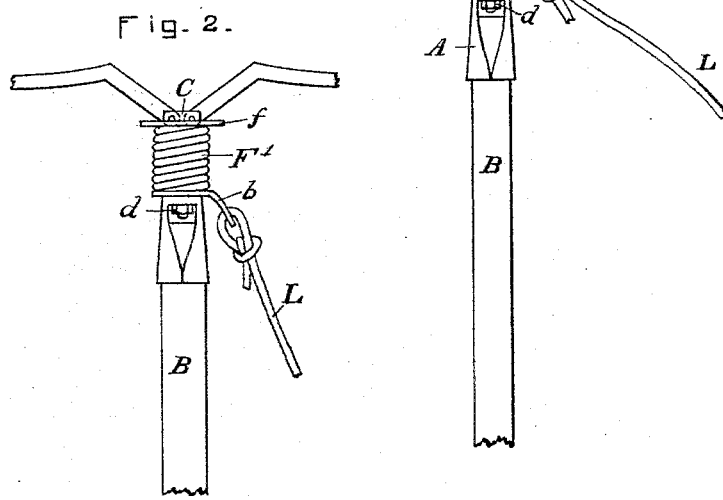
Witnesses,
James B. Murphy
Wm. Devereaux
Inventor.
Homer F. Norton;
by H. L. Reynolds,
his atty.
ANDREW B. GRAHAM, PHOTO-LITHO, WASHINGTON, D.C.

UNITED STATES PATENT OFFICE.

HOMER F. NORTON, OF SEATTLE, WASHINGTON.

FISH OR SEAL SPEAR.

SPECIFICATION forming part of Letters Patent No. 546,428, dated September 17, 1895.

Application filed August 17, 1894. Serial No. 520,603. (No model.)

*To all whom it may concern:*

Be it known that I, HOMER F. NORTON, a citizen of the United States, residing at Seattle, in the county of King and State of Washington, have invented certain new and useful Improvements in Fish and Seal Spears; and I do hereby declare the following to be a full, clear, and exact description of the invention, such as will enable others skilled in the art to which it appertains to make and use the same.

My invention relates to spears or devices for catching animals by impaling them therewith.

It consists, essentially, of two curved barbed arms pivoted at one end to a shank having a socket for the reception of a pole. These arms are held apart by a bar extending across the open jaws thereof and are closed by a spring.

In the drawings, Figure 1 shows the device in open position by solid lines and in closed position by dotted lines. Fig. 2 shows the use of a different kind of spring.

The arms E are curved much like a fish-hook, but have double points $e$ and $e'$, one being within the other. The double points are not considered essential, but desirable. At their inner end they are pivoted to a piece C, so that their points or hooks will be in or toward each other. When these arms are brought together, the points on the opposite arms are very near touching.

The piece C is reduced in area just below the pivot-point of the arms, so that a link may be placed thereon for attaching a line, or the line attached direct. On the end opposite the pivots it has a bolt formed, which passes through a hole in the end of the socket A and is secured thereto by the nut $d$.

A spring F, which is an ordinary flat steel spring with a hole in each end, such as used for spring-traps, has one end clamped between the piece C and the socket and embraces by the hole in the other end the straight inner ends of the arms E. The trigger G, which consists of a straight rod, is placed with its ends in the notches on the inner sides of the spurs or inner hook $e'$ on the arms and holds them open. A cord H is fastened to its center and to some part of the spear to prevent loss of the trigger.

In using this spear the spring F is compressed, the arms E opened, and the trigger G placed to keep them open. The pole B, which is removable, is then inserted in its socket. In throwing this at a seal or other animal it is desired to catch the trigger G will be displaced by contact of either the trigger or one of the arms with the animal and the spring F will close the arms together, thus sticking the barbs or spurs into it. These are made recurved similar to a fish-hook, so that the more it pulls the deeper they go, and it cannot get away. The points may be made barbed, as shown at $e$, or plain, as shown at $e'$. The pole B, which is loosely inserted in the socket, will come out when the animal is struck, and the cord L be used to draw in the catch.

Fig. 2 shows the use of a coiled spiral spring surrounding the piece C. This spring is coiled open or so as to have its coils separated when unrestrained. A large washer or a plate $f$ is placed above the spring to enable it to be easily compressed. In this figure a plate $b$, having a hole for the attachment of the line L, is placed under the spring F'.

This spear is much more likely to catch the object thrown at than a single-pointed spear, as the effective width is the distance between the points when open, while the common spear has only one point. Moreover, if it strikes the animal in any part it will close upon it and hold it.

Having thus described my invention, what I claim, and desire to secure by Letters Patent, is—

In a seal spear the combination with the socket piece for the insertion of a pole, two oppositely curved arms pivoted thereto and having retaining spurs or sharp points projecting from their inner edges and a notch upon each for the trigger, of a trigger consisting of a straight bar adapted to engage by its ends the notches on each arm to hold them spread and to be displaced therefrom to release the arms by contact with the seal, a closing spring surrounding the socket piece and the pivoted ends of the arms, and a flexible connection from the trigger to the body of the spear to prevent their separation, substantially as shown and described.

In testimony whereof I affix my signature in presence of two witnesses.

HOMER F. NORTON.

Witnesses:
H. L. REYNOLDS,
J. W. REYNOLDS.